MAGNETIC SWITCH ASSEMBLY

Filed May 26, 1953 5 Sheets-Sheet 1

INVENTOR.
Jan A. Rajchman

BY Morris Rabkin
ATTORNEY

INVENTOR.
Jan A. Rajchman
BY Morris A. Rabkin
ATTORNEY

Oct. 6, 1959 J. A. RAJCHMAN 2,907,986

MAGNETIC SWITCH ASSEMBLY

Filed May 26, 1953 5 Sheets-Sheet 3

INVENTOR.
Jan A. Rajchman

BY Morris Rabkin

ATTORNEY

INVENTOR.
Jan A. Rajchman
BY Morris A. Rabkin
ATTORNEY

Oct. 6, 1959

J. A. RAJCHMAN 2,907,986

MAGNETIC SWITCH ASSEMBLY

Filed May 26, 1953

5 Sheets-Sheet 5

INVENTOR.

Jan A. Rajchman

BY Morris A. Rabkin

ATTORNEY

United States Patent Office 2,907,986

Patented Oct. 6, 1959

2,907,986

MAGNETIC SWITCH ASSEMBLY

Jan A. Rajchman, Princeton, N.J., assignor to Radio Corporation of America, a corporation of Delaware Application May 26, 1953, Serial No. 357,403

22 Claims. (Cl. 340—174)

This invention relates to magnetic switches and also to improvements in construction and assembly of such magnetic switches.

In an article entitled "Static Magnetic Matrix Memory and Switching Circuits," by Jan A. Rajchman, published in the RCA Review of June 1952, there is described a magnetic matrix employing an array of magnetic cores. The array of magnetic cores is described as a memory device capable of storing binary coded information in the form of two conditions of magnetic saturation of the cores. Also described in this article is a magnetic switching device which is used to drive the cores in the magnetic matrix memory.

An improved form of magnetic switch is described in an application Serial No. 337,902, filed on February 20, 1953, by this applicant, now U.S. Patent No. 2,734,184, and assigned to the assignee of this application. This improved switch may be constructed as an array of magnetic cores of toroidal shape arranged in rows and columns. Each row and column of cores is linked by a different selecting coil, and each core is provided with a different output winding. Selecting current pulses are applied to one row and one column selecting coil. The switch operates on the basis of double coincidence of current pulses; that is to say, the single core that is common to both the selected row and column is the only one that receives sufficient drive to change materially the flux in the core and produce a signal in the output winding.

In many applications of these switches, particularly when used to drive a magnetic memory array of cores, the switch is also used for impedance transformation. This is usually a step down of voltage with consequent step up in current. Therefore, it is desirable to use a large number of turns in the primary or selecting winding on each core, and a very small number, usually one turn, in the secondary or output coil. However, with a large number of turns in the selecting winding on each core of the switch there are delay effects on current pulses in a row or column selecting coil due to capacitive coupling between the row and column coils and between turns of a given winding. Where a winding made up of several turns is provided on each core, and these windings are connected in series to form a selecting coil, the delay effects are large and not uniform for cores in different positions in a row or column. As a result, energizing pulses generally do not arrive simultaneously at a selected core at the intersection of a row and column selecting coil. This has an adverse effect upon the operation of the switch and on the amplitudes of the output pulses.

Accordingly, it is an object of this invention to provide a new and improved fast-action magnetic switch which minimizes the delay effects provided by large numbers of windings on a core.

Another object of this invention is to provide a simple and reliable magnetic switch in which delay effects are substantially uniform.

Still another object of this invention is to provide a simple and reliable magnetic switch for multicoincidence switching.

In the assembly of a magnetic switch of this type, a plurality of selecting coils are wound on each one of a relatively large number of small magnetic cores. In addition, each core has an output winding and may be provided with one or more inhibiting or biasing windings. Furthermore, a large number of terminals are needed for the different windings. It is apparent, therefore, that the assembly of a magnetic switch may become exceedingly complex and unwieldy as the size of the switch increases.

Therefore, it is a further object of this invention to provide an improved magnetic switch that is simple in construction.

Still a further object of this invention is to provide a magnetic switch assembly that is relatively simple and inexpensive to construct and that is reliable in operation.

These and other objects of this invention are achieved in a magnetic switch of the type described in which magnetic cores of toroidal-like shape are arranged in rows and columns. All the cores in each row or column are linked by a single selecting coil or winding that is formed of a plurality of turns. All of the turns in a coil link all the cores in any one row or column so that any delay effects are substantially uniform. The differential delay effects in a selecting coil formed in this manner correspond to those due to a single turn and, thus, are relatively small. In contrast, where a selecting coil is formed by connecting in series separate windings formed of different turns on each core, the differential delay effects are the cumulation of delays on the separate cores due to the large number of turns in each separate winding. As a result, the delays are relatively large. Thus, by means of this invention, the selecting coils become identical with the selecting windings.

The row and column selecting coils or windings are wound on a frame with straight coil sides which results in easier assembly. The coils are arranged, in different embodiments of this invention, so that the coil sides of each row coil cross the coil sides of each column coil in one or more points. Thereby, one, two, three, or four magnetic cores may be suspended on the coils at their points of crossing and linked by a single output winding to utilize different types of cores and to provide different operations. The row and column coils are spaced from each other by substantially the internal diameter of the magnetic cores. This arrangement, together with the small surface areas that the crossed coils present to each other, results in a low capacitive coupling between coils, and, thus, minimizes delay effects.

The novel features of this invention, as well as the invention itself, both as to its organization and mode of operation, may be better understood from the following description when considered together with the accompanying drawings, in which.

Figures 1A, 1B, 5, 6:
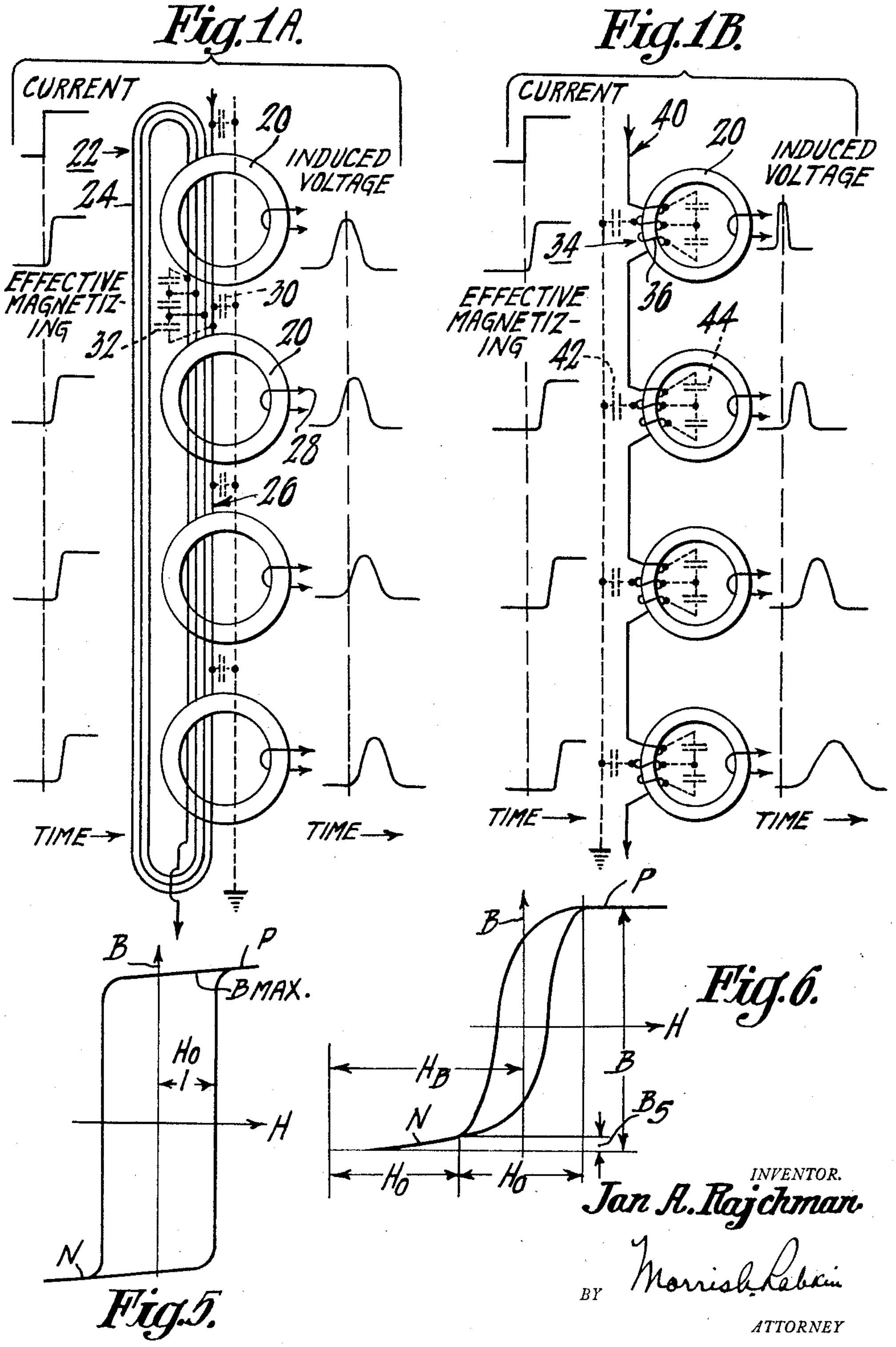
Figure 1A is a schematic diagram of a single selecting-coil unit of a magnetic switch embodying this invention together with a graphical diagram of waveforms occurring along the unit.
Figure 1B is a schematic diagram of a series-connected selecting-coil unit together with a graphical diagram of waveforms occurring along the unit.
Figure 5 is a curve showing a hysteresis characteristic of one type of magnetic material.
Figure 6 is a curve showing a hysteresis characteristic of another type of magnetic material.

Referring now to Figure 1A, there is shown a schematic diagram of a magnetic switch unit embodying this invention. The unit incorporates a plurality of magnetic cores 20 which are shown as toroidal shaped, although other shapes may be used. A primary or selecting coil 22, in the form of an elongated loop and made up of a plurality of conductive turns 24, has a coil side 26 linked through all of the magnetic cores 20. Each of the turns 24 of the coil 26 passes through all of the cores, so that the coil is formed as a single winding with the cores 20 mounted at spaced points along the coil. Each core also has a separate secondary or output coil 28.

When several such selecting coil units are mounted adjacent each other, as in a magnetic switch, there exists a capacitive coupling 30 between the coils as well as a capacitive coupling 32 between the turns of each coil. The intercoil capacitance 30, which is shown in Figure 1A as between the coil and ground for simplicity, and the interturn capacitance 32 produce delay effects on energizing currents applied to the coil, and on the voltages induced thereby in the output coils 28. The waveforms produced along the unit by the application of a step current function are also shown in Figure 1A.

For the purpose of comparing the delay effects, there is shown in Figure 1B a selecting-coil unit that is wound in the conventional manner. Each core 20 is provided with a different primary winding 34, made up of several turns 36, and an output winding 38. The different primary windings 34 on the cores are connected in series to form a selecting coil 40. The delay effects on the waveforms that are produced by the intercoil and interturn capacitances 42, 44, when the coil 40 is energized by a step current function, are shown in Figure 1B. In the case of the lumped windings 34 connected in series, shown in Figure 1B, the leading edge of the current pulse becomes progressively more delayed as it passes through the coil, and, likewise, the peaks of the induced voltage pulses from the first to the last core are progressively more delayed. Also, the voltage pulses are progressively broader, because of the cumulative effect of the interturn capacities.

However, in the case of a selecting coil having the same turns linking all of the cores, as shown in Figure 1A, there is but a small difference in delay of the current pulse from the first to the last core. Furthermore, the voltage pulses are fairly broad on all cores, with only a slight broadening along the line of cores, and the progressive delay of the voltage peaks is only a slight one. The outputs are much more uniform where the same coil turns, or same winding, link all of the cores, the equalization consisting of a broadening of all of the voltage pulses. In this case, the differential delay and differential broadening effects correspond to those due to a single turn; while in the case of the series lumped windings, the differential effects are due to the total number of separate turns in series. It is evident, therefore, that a coil formed as a single winding with the same turns linking all of the cores provides superior operation where it is desired that all of the cores along a line be excited simultaneously and that the output voltage pulses be uniform.

Figure 2:
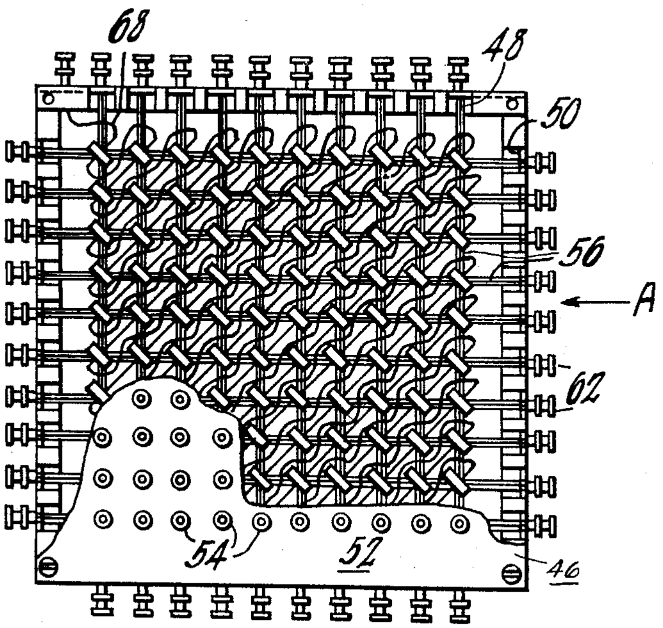
Figure 2 is a plan view of a magnetic switch assembly embodying this invention with parts cut away.
Figure 3:
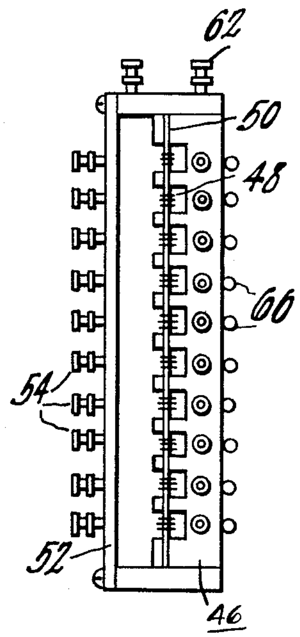
Figure 3 is a side view of a magnetic switch assembly viewed along the direction of arrow A in Figure 2.
Figure 4:
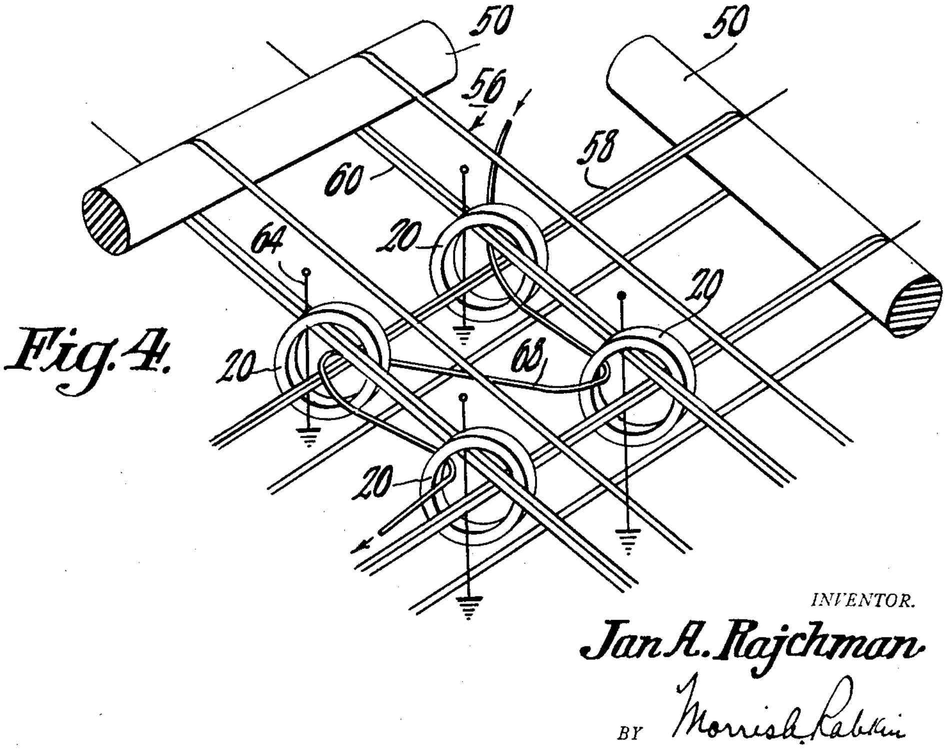
Figure 4 is a perspective view of a portion of the magnetic switch assembly shown in Figure 2.

In Figures 2, 3, and 4 there are shown different views of a magnetic switch assembly embodying this invention. A frame 46 made of insulating material is formed as a square case, the sides of which have a plurality of notches 48 cut in the top edges. Two pairs of bobbin elements, in the form of Bakelite rods 50, are fixed in grooves extending along the sides of the frame. The frame includes a plate 52 that is secured to the top of the case for supporting the output terminals 54.

A plurality of row and column selecting coils 56 are wound on the two pairs of parallel Bakelite rods 50. Each coil 50 is formed of a plurality of turns with a coil side passing through a plurality of cores in the manner described with respect to the unit shown in Figure 1A. The arrangement is such that one coil side 58 of each row coil crosses one coil side 50 of each column coil at a point. A core is suspended at each point of crossing of two coil sides at an angle of 45° to the coil sides with the coil sides linked therethrough. The turns are kept straight and perpendicular to the Bakelite rods so that they may be easily pulled tight, thereby providing a firm support for the cores. The ends of the selecting-coil turns are connected to terminals 62 on the sides of the frame case 46. A separate output winding 64 is threaded through each core, and it is soldered at one end to a terminal 54 in the top frame plate 52, and at the other end to one of a mesh of bus wires 66 secured to the bottom of the case which provide a common return for the outputs. A metal common-return plate (not shown) may be substituted for the bus wires, but soldering to the plate is less convenient.

The pairs of Bakelite rods 50 lie in planes that are spaced from each other a distance approximately equal to that of the internal diameter of the magnetic cores 20. Thus, the adjacent coil sides 58, 60 of intersecting row and column rows are likewise spaced from each other the same amount to minimize capacitive coupling between the coils. The capacitive coupling between coils is further reduced by the transverse crossing of row and column coils as a result of the small area of coupling that the windings present to each other.

The perpendicular crossing of selecting coils is appropriate where the height of the magnetic cores is small compared to the internal diameter. However, where the height of the cores is relatively large, an oblique angle of crossing of coils is necessary in order that the turns be kept straight. The construction is otherwise the same, except that there is a rhomboidal shape to the frame instead of square.

In the magnetic switch described thus far, the magnetic cores used are of the type having a rectangular hysteresis characteristic, substantially as shown in Figure 5. It is seen from this curve that a critical coercive force $+H_0$ is required to drive a magnetic core from saturation in one polarity to the opposite saturation and, thereby, to induce a substantial output voltage. If a magnetic core is saturated at point N or P on the curve, a magnetomotive force less than $+H_0$ leaves the core substantially unchanged, and substantially no output voltage is induced in the output winding. Thus, in the magnetic switch, the current pulses applied to each selecting coil are of magnitude to produce a magnetomotive force of one-half $H_0$. Consequently, only the core at the intersection of two energized coils is sufficiently excited to produce a substantial output voltage. Core materials having a rectangular hysteresis characteristic are relatively expensive and usually require high driving currents to effectuate turnover in polarity.

In Figure 6, there is shown a hysteresis characteristic of another core material which is relatively inexpensive and plentiful. In the patent application Serial No. 337,902, now U.S. Patent 2,734,184, noted above, there is described a system for utilizing core materials of this type. An inhibiting or negative biasing magnetomotive force $-H_b$ is applied to each of the cores having a coercive force $H_0$; the bias $H_b$ is greater than $H_0$. If the current pulses applied to each of the selecting coils produce a magnetomotive force of the order of $H_0$ (or even somewhat less), only one core will receive a double excitation. This doubly excited core has a considerable flux excursion B and induces a substantial output voltage. However, a core with a single excitation has a negligible change in flux as shown by $B_s$ in Figure 6.

The inhibiting or biasing of the cores in the switch is by means of an inhibiting winding 68 which is interlaced through all of the cores, as shown in Figures 2 and 4. This inhibiting winding 68 carries a direct current or is pulsed at the same time that the selecting coils are pulsed. The inhibiting winding is used to further reduce delay effects in the selecting coils. This is done by positioning the inhibiting winding in the openings in the cores between the crossed sides 58, 60 of the selecting coils 56. Since the inhibiting winding 68 is at a fixed potential when the selecting coils are energized, the inhibiting winding functions as an electrostatic field between the selecting coils. Thus, the detrimental effects of intercoil capacitive coupling as substantially eliminated.

Figure 7:
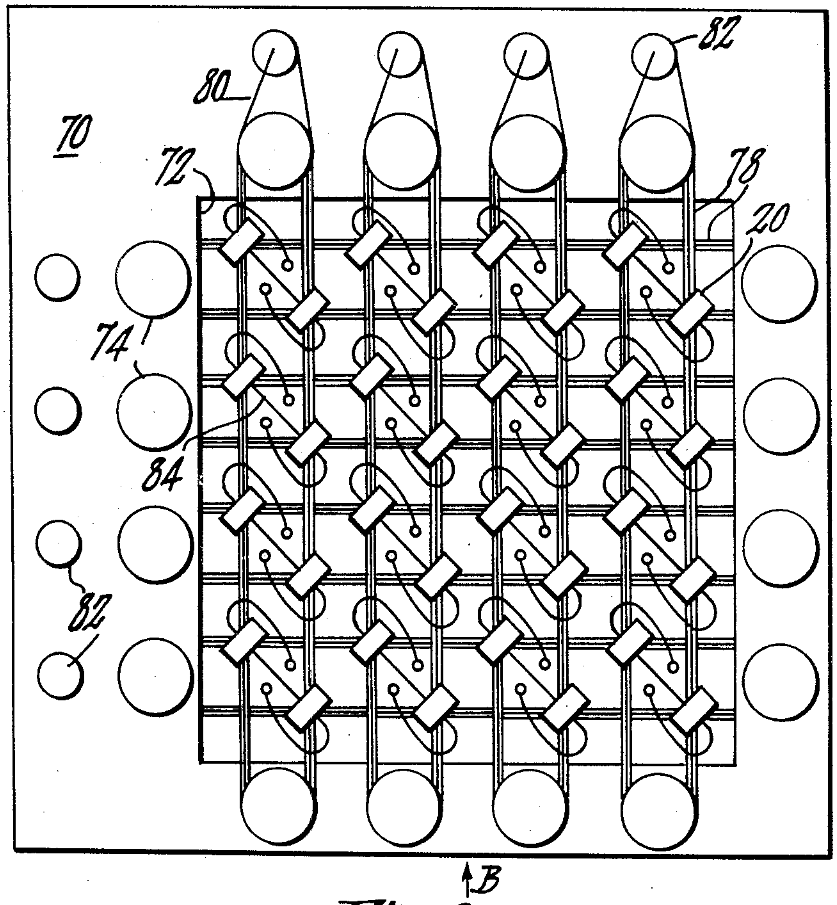
Figure 7 is a plan view of another magnetic switch assembly embodying this invention.
Figure 8:
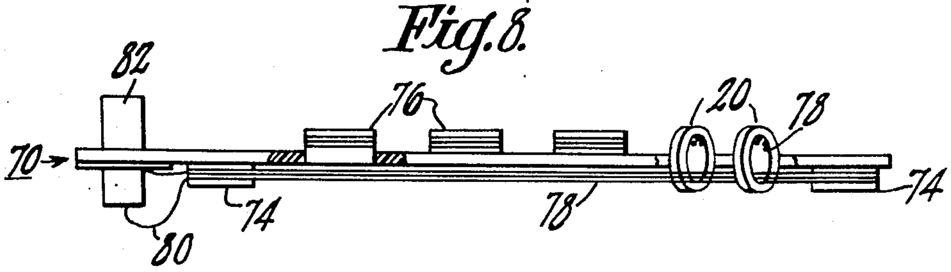
Figure 8 is a side view with parts broken away of an embodiment of this invention as viewed along the direction of arrow B in Figure 7.

Another embodiment of this invention is shown in Figures 7 and 8. A frame made of insulating material includes a rectangular plate 70 with a square cut-out window 72. Row and column bobbin elements include opposed pairs of pegs 74, 76 with the row pegs 74 projecting from one side of the frame plate 70 and the column pegs 76 projecting from the other side. Each selecting coil 78, is wound between a pair of opposed pegs, and is made up of a plurality of conductive turns 80, as described above. The ends of the coil turns are taken at the same coil end and connected to coaxial terminals 82 on two sides of the frame plate.

The thickness of the frame plate is chosen so that the distance between the row and column selecting coils is about equal to the internal diameter of the toroidal-shaped magnetic cores. The coil sides of the column and row coils are straight, and the row coils are transverse to the column coils. The row and column coils lie in parallel planes. As a result, each row coil side crosses each column coil side at a different point, so that each row coil crosses each column coil at four points. The magnetic cores 20 are suspended with the coil sides linked through at different points of crossing, and have output windings 84 linked through their openings. The angle of crossing of the coil sides, and the angle between the magnetic cores and coil sides depends on the height of the cores, as discussed above.

Figures 9, 10, 11, 12:
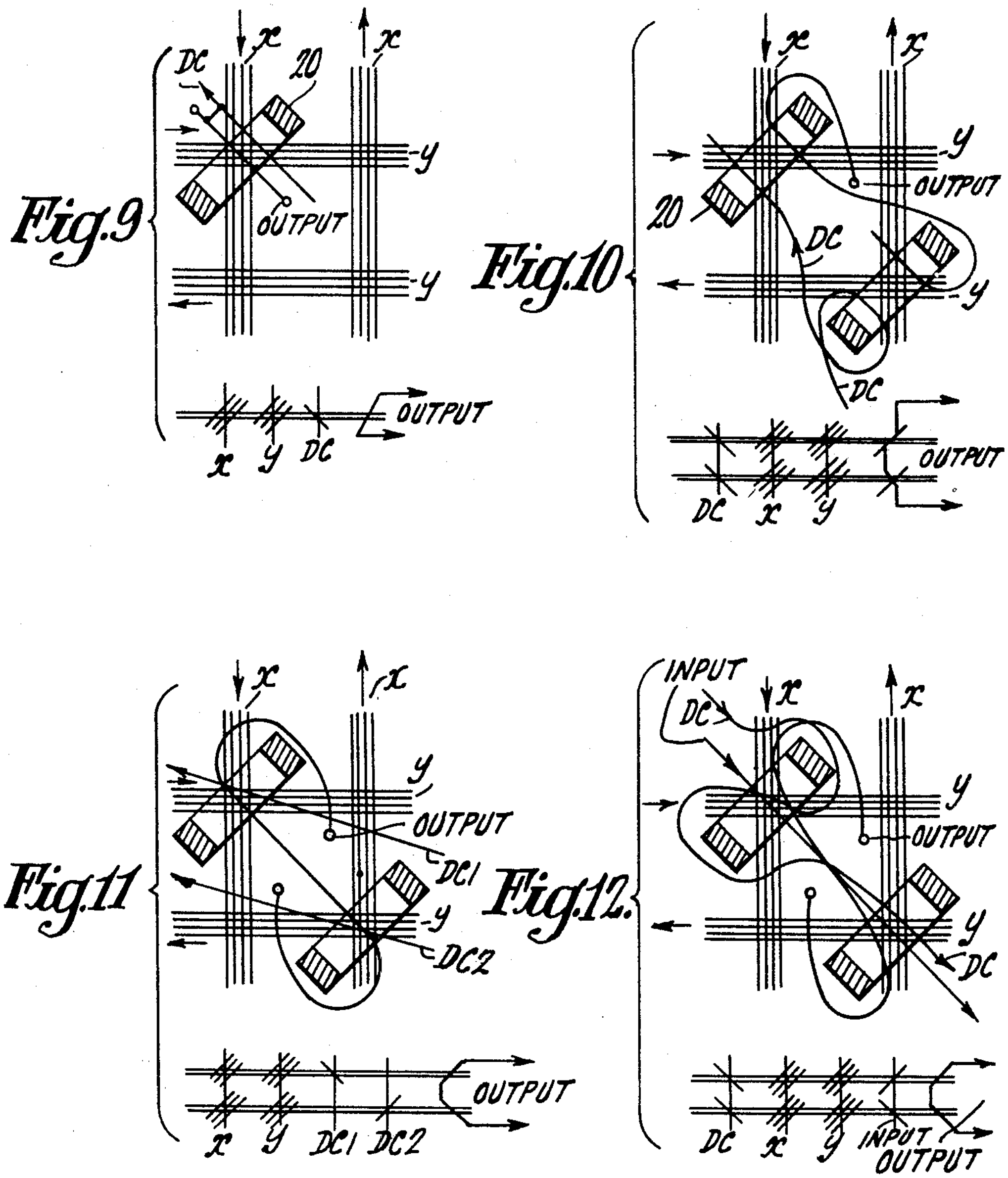
Figure 9 is a schematic diagram of a wiring arrangement of a one-core switch unit utilizing the assembly of Figure 7.
Figure 10 is a schematic diagram of a wiring arrangement of a two-core switch unit utilizing the assembly of Figure 7.
Figure 11 is a schematic diagram of another wiring arrangement of a two-core switch unit utilizing the assembly of Figure 7.
Figure 12 is a schematic diagram of another wiring arrangement of a two-core switch unit utilizing the assembly of Figure 7.

The crossing of each row and column selecting coil at four points lends itself to many useful applications. Consider the energization of any one of the combinations of a row and a column selecting coil. This results in the identical selection of four points of crossing, one or more of which may be utilized. In Figure 9, there is shown a switch unit that may be used with the assembly of Figure 7. The unit is made up of a column selecting coil X and a row selecting coil Y, and a single magnetic core 20 mounted at one of the points of crossing of the two coils. A D.-C. inhibiting or biasing winding and an output winding are linked to the core. The sense of the windings is shown in the legend in Figure 9, in which the horizontal rectangle represents the magnetic core, the slanting lines represent the windings through the core, and the vertical lines represent the series connections of the windings. The lines slanting upwards to the right represent windings having a P going sense, and those to the left represent windings having an N going sense. This switch unit operates in the same general manner as that shown in Figure 2.

The switch assembly of Figure 7 may also be used for various two-core or four-core switch units such as shown in Figures 10, 11, 12 and 13. In Figure 10, the switch unit is essentially the same type as that in Figure 7 except that two magnetic cores are provided, one on each of two diagonally opposite points of crossing. The bias winding is linked through both cores with the same sense of winding, and the output winding is connected in a series-aiding sense through the cores, so that the cores are in parallel. In this way, the same mode of operation is produced, but a greater output is provided, or less magnetic induction is needed for a given output.

In Figure 11, there is shown a two-core switch unit of the type described in a patent application Serial No. 322,973 by this applicant, now U.S. Patent 2,666,151, and assigned to the assignee of this application. In this unit, a magnetic core having an S-shaped, inperfect-saturation hysteresis characteristic may be used. One of the cores is biased by one inhibiting winding to the N region of the characteristic, and the other is oppositely biased by a second inhibiting winding to the P region. The output winding is linked to the cores in series-opposing fashion. The biasing currents are such that when only one selecting coil is energized it causes equal magnetic excursions of both cores, and when both selecting coils are energized, the magnetic excursion of one core exceeds the other substantially. Thus, the voltages induced by energizing one coil are cancelled in the output coil, and a substantial output is produced when both coils are energized. In this way, the lack of perfect saturation in the cores is compensated.

In Figure 12, there is shown a two-core switch unit of the type described in patent application Serial No. 339,861 by this applicant, now U.S. Patent 2,782,399, and assigned to the assignee of this application. In this type of switch a modulated input signal is switched to any one of a number of outputs by switching one core unit to an unsaturated state and maintaining the other units saturated. There is a balanced connection of the cores to eliminate output voltages due to large flux changes in the cores accompanying the switching action. This is done with a two-core unit in which the two cores have both selecting coils wound in a positive sense, the bias windings in a negative sense, and the input and output windings in opposite senses, as shown in Figure 12. As a result, voltages induced by both cores being driven by one or both selecting coils are of opposite polarity in the output windings, and, therefore, they are neutralized. However, the desired input signals are transmitted through the selected cores and are added in the output coil, since the senses of the input and output windings are in the same relationship so that opposing-winding effects are cancelled.

All four points of crossing of a row and column selecting coil in the assembly of Figure 7 may be utilized. This may be done by simply paralleling four cores as an extension of the arrangement shown in Figure 10. Similarly, the two-core arrangements shown in Figures 11 and 12 may both be paralleled in order to obtain a larger output or less magnetic induction for a given output. The four-core arrangement is also useful for another balanced-core system described in application Serial No. 339,861, now U.S. Patent 2,782,399, noted above. This system, shown in Figure 13, combines the balanced-core connection shown in Figure 12 with the system for compensation of imperfect saturation shown in Figure 11. The two pairs of diagonally-opposite, balanced-connected cores have opposite D.-C. biases, and the output windings through the two pairs of cores are connected in series opposition. Thus, it is seen that the switch assembly shown in Figure 7 is adapted for use with various types of magnetic switches and is especially useful where a four-core unit is required to have identical combinatorial selection.

Figures 13, 14, 15:
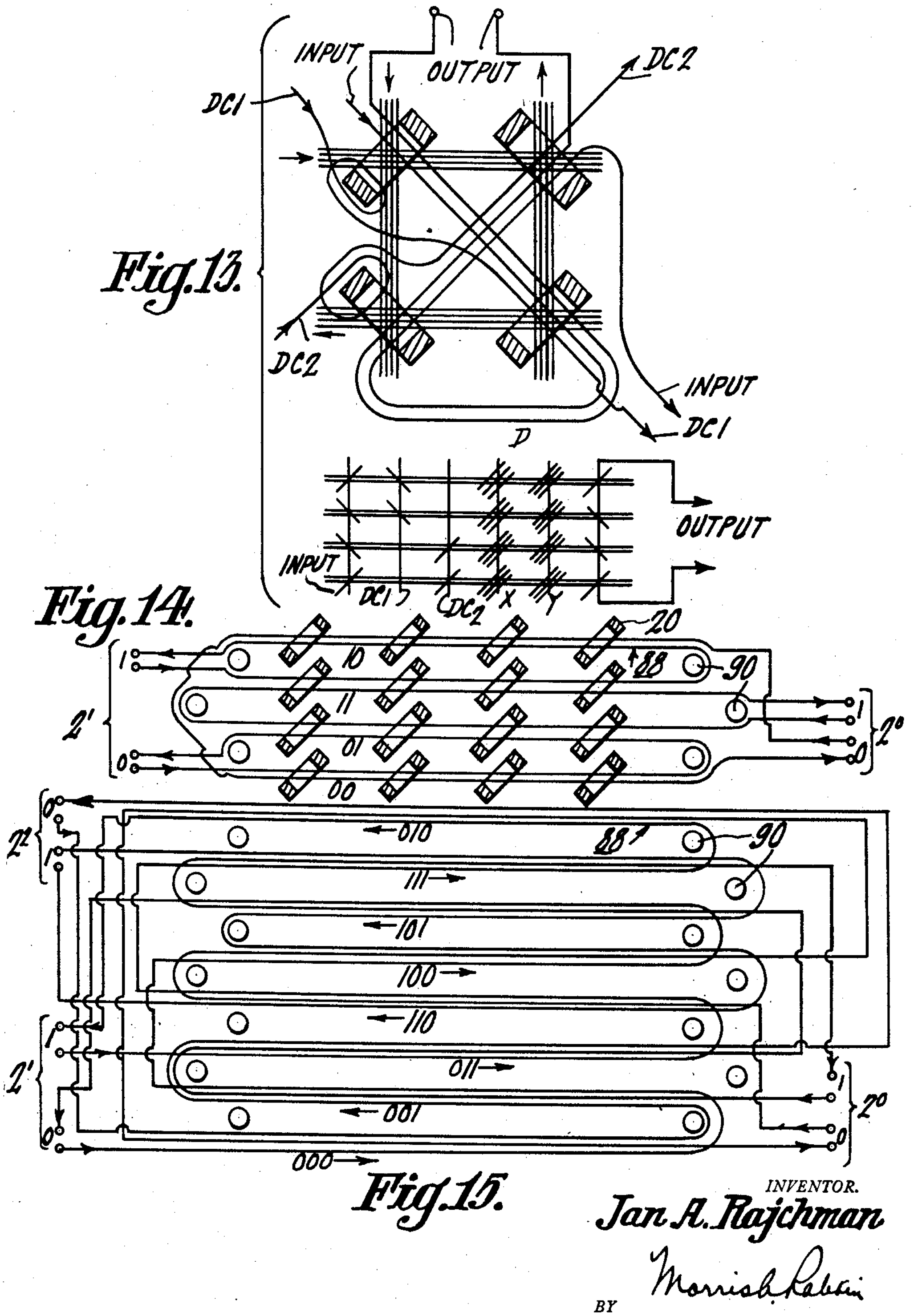
Figure 13 is a schematic diagram of a wiring arrangement of four-core switch unit utilizing the assembly of Figure 7.
Figure 14 is a schematic diagram of a wiring arrangement for a multiple-coil combinatorial switch embodying this invention.
Figure 15 is a schematic diagram of another wiring arrangement for a multiple-coil combinatorial switch embodying this invention.

The peg type of construction of a switch assembly, shown in Figure 7, may also be used for a switch in which each line of cores is linked by a combination of selecting coils and is selected by a combinatorial energization of these coils. A simple form of such a switch, embodying this invention, is shown in Figure 14. Only the row coils are shown. Details of the frame construction, the inhibit and output windings, and the transverse column coils are omitted to simplify the drawing. There are four coils which are identified in the drawing by a binary notation, and which are wound combinatorially in accordance with this notation. Two coils are respectively represented by the binary digits zero and one for the $2^0$ position, and the other two coils by the digits zero and one for the $2^1$ position. The identifying digits are shown at the terminals of the coils. Each line of cores is linked by a selecting line 88 which is formed by a different combination of two coils, with a coil side from each in push-pull. Each coil has two coil sides that are respectively a part of two selecting lines to link two lines of cores. The coils are shown as having a single turn, for simplicity of illustration. Actually each coil has a plurality of turns in the manner shown, for example, in Figure 7. With a double row of pegs 90 on each side, the coil sides are made straight and taut.

With this arrangement, the coils are combinatorially wound according to a number system, in this case the binary system, and the energization of the coils is in accordance with the same system. It is seen that with the application of current pulses to two of the terminals, one for the $2^0$ binary place and one for the $2^1$ binary place terminals, only one of the lines of cores receives a double excitation from current flowing in the same direction in two coil sides, and the others receive a single or zero excitation. For example, if both zero coils are energized, only the lowermost line of cores receives a double excitation. Together with the column coils, and with magnetic cores suspended on the points of crossing, a 16-core switch is formed. A single core is selected, in such a switch, by a 4-times excitation from two row and two column windings. All the other cores have less than this excitation.

This form of multicoincidence switching, based on combinatorial winding of the coils, may be extended to any number of binary positions. In Figure 15, there are shown the rows of cores of a switch with three binary positions. There are six coils identified by binary notation. Each line of cores is linked by a selecting line 88 made up of a different combination of three coils, including a coil side from each. Each coil has four coil sides respectively linked through four lines of cores, and it is wound about a double row of pegs 90 as before. To select any one of eight lines of cores, three out of six terminals are pulsed. Together with the column coils, a 64-way switch is formed which requires only twelve driver circuits. This compares favorably with the switch construction of Figures 2 or 7 which require sixteen driver circuits for a 64-way switch. Combinatorial winding of the coils to provide multicoincidence switching of this type is not limited to a binary number radix. In general, for any radix the number of rows or columns of cores or selecting lines for the rows or columns is equal to the radix raised to an exponent, the number of coil sides in each selecting line is equal to the exponent, and the number of coils is equal to the product of the radix and exponent.

This combinatorial arrangement of a multiple-coil switch is not limited in utility to the arrangement of intersecting row and column coils. For example, the three-binary-position arrangement shown in Figure 15, with a single core on each selecting line and with separate output windings, for each core may be used to convert signals in binary notation to an octal notation.

It may be seen from the above descriptions of embodiments of this invention, that a magnetic switch assembly is provided in which multiple-turn coils are used with a minimum of detrimental delay effects. The detrimental effects of interturn capacity within a coil are minimized. The intercoil capacitive coupling is low due to relatively large spacing between crossing coils and the small coupling area presented. The construction is simple and lends itself to winding wires through any shaped cores. The construction is especially suitable where more than one core is required to have identical selection or is used for the same output. Multicoincidence combinatorial switching may also be provided with this construction.

What is claimed is:

1. A magnetic switch assembly comprising a plurality of first coils, a plurality of second coils mounted transversely to said first coils and crossing said first coils at a plurality of points, each of said coils being formed of a plurality of conductive turns, and a plurality of magnetic cores, each of said cores being made of a material having a substantially rectangular hysteresis characteristic, each of said magnetic cores being mounted at a different one of said points of crossing and linked to said plurality of turns of each of the coils crossing thereat, said plurality of turns of each of said coils being linked to a plurality of said cores.

2. A magnetic switch assembly as recited in claim 1, wherein each of said coils has a first and a second coil side, each of said first and second coil sides of said second coils respectively crosses each of said first and second coil sides of said first coils at a point, and each of said magnetic cores is mounted at a different one of said points of crossing of said first coil sides and each said core is so linked by being threaded by the said coil sides at its respective point of crossing and said second coil sides.

3. A magnetic switch assembly as recited in claim 1, wherein said plurality of first coils is arranged in a plurality of groups, said plurality of second coils is arranged in a plurality of groups, each of said magnetic cores being coupled to a plurality of first coils with one from each of said groups and to a plurality of second coils with one from each of said groups.

4. A magnetic switch assembly comprising a frame, a plurality of first coils mounted on said frame, a plurality of second coils mounted on said frame transversely to said first coils, a coil side of each of said second coils crossing a coil side of each of said first coils at a point with a space therebetween, each of said coil sides being formed of a plurality of conductive turns, a plurality of magnetic cores mounted at different ones of said points of crossing, and linked to said pluralities of turns of said coil sides crossing thereat, each of said cores being made of a material having substantial flux at remanence, and an inhibiting winding interlaced among said magnetic cores and passing between said coil sides at said points of crossing.

5. A magnetic switch assembly comprising a frame, a plurality of first coils mounted on said frame, a plurality of second coils mounted on said frame transversely to said first coils and crossing said first coils at a plurality of points, each of said coils being formed of a plurality of conductive turns, and a plurality of magnetic cores each having an opening therein, each of said cores being made of a material that is substantially saturated at remanence, each of said cores being supported at a different one of said points of crossing and receiving through the opening therein and thus being linked by said plurality of turns of each of said coils crossing thereat, said plurality of turns of each of said coils being linked to a plurality of said cores.

6. A magnetic switch assembly as recited in claim 5, wherein said coil sides received through the openings in each of said cores are spaced from each other.

7. A magnetic switch construction as recited in claim 5, wherein each of said first and second coils lies substantially in a plane, and the planes of said first coils are transverse to the planes of said second coils.

8. A magnetic switch construction as recited in claim 5, wherein each of said first and second coils lies substantially in a plane, and the planes of said first coils are parallel to the planes of said second coils.

9. A magnetic switch assembly comprising a frame made of insulating material, pluralities of spaced first and second bobbin elements, each of said bobbin elements being fixed to said frame and made of insulating material, pluralities of first and second coils respectively extending between said first and second bobbin elements and having coil ends therearound, said coils having coil sides formed of a plurality of conductive turns, a coil side of each of said first coils crossing a coil side of each of said second coils at a point, and a plurality of magnetic cores each having an opening therein, said cores being made of a material having substantial flux at remanence, said cores being supported at different ones of said points of crossing with said plurality of turns of said coil sides crossing thereat passing through the openings in said cores to link said cores to said coils.

10. A magnetic switch assembly as recited in claim 9 wherein each of said coil sides are substantially straight, said coil sides of said first coils are substantially parallel, and said coil sides of said second coils are substantially parallel.

11. A magnetic switch assembly as recited in claim 10 wherein said first bobbin elements lie substantially in a first plane and said second bobbin elements lie substantially in a second plane spaced from said first plane.

12. A magnetic switch assembly as recited in claim 10 wherein said frame includes a sheet member, said first bobbin elements project from one face of said sheet member, said second bobbin elements project from the opposite face of said sheet member, each of said coils has a plurality of coil sides, each of the coil sides of said first coils crosses each of the coil sides of said second coils at a point.

13. In a magnetic switch construction, the combination comprising a frame, a plurality of spaced bobbin elements fixed to said frame, a coil extending between said bobbin elements and wound therearound, said coil being formed of a plurality of conductive turns, and a plurality of magnetic cores mounted at spaced points on said coil, said cores being made of a material having a substantially rectangular hysteresis characteristic, each of said cores having an opening therein and being linked to said coil by receiving said plurality of conductive turns of said coil therethrough.

14. In a magnetic switch, the combination comprising, a plurality of coils operatively arranged in a plurality of different groups, each of said coils being formed of a plurality of conductive turns, and a plurality of magnetic cores arranged in a plurality of different lines, said magnetic cores being made of a material having substantial flux at remanence, each of said lines of cores being linked by said plurality of conductive turns of each of a plurality of said coils with one coil from each of said groups.

15. In a magnetic switch, the combination comprising, a plurality of coils operatively arranged in a plurality of groups, each of said coils having a plurality of coil sides, each of said coil sides having a plurality of conductive turns, a plurality of selecting lines each formed of a different combination of a plurality of different coil sides of said coils, each of said selecting lines including a coil side of a coil from each of said groups, and a plurality of individual magnetic cores linked to said selecting lines, each of said cores being made of a material having substantial flux at remanence.

16. A magnetic device comprising a plurality of first coils, a plurality of second coils positioned transversely to said first coils and crossing said first coils at a plurality of points, each of said coils being formed of a plurality of conductive turns, and a plurality of magnetic core means, said magnetic core means being made of a material that is substantially saturated at remanence, each of said magnetic core means being linked at a different one of said points of crossing to said plurality of turns of each of the coils crossing thereat, said plurality of turns of each of said coils being linked to a plurality of said core means.

17. A magnetic device comprising a plurality of first coils, a plurality of second coils positioned transversely to said first coils and crossing said first coils at a plurality of points, each of said coils being formed of a plurality of conductive turns, a plurality of magnetic core means, said magnetic core means being made of a material having a substantially rectangular hysteresis characteristic, each of said magnetic core means being linked at a different one of said points of crossing to said plurality of turns of each of the coils crossing thereat, said plurality of turns of each of said coils being linked to a plurality of said core means, and a plurality of additional coils each linked to a different one of said magnetic core means.

18. A magnetic switch arranged in accordance with a certain number radix, said switch comprising a plurality of coils operatively arranged in a plurality of groups, each of said coils having a plurality of coil sides, a plurality of first selecting lines each formed of a different combination of an aligned plurality of said coil sides, each of said selecting lines including a coil side from each of said groups, a plurality of additional coils having coil sides arranged as a plurality of second selecting lines transversely to said first lines, said first and second lines crossing at a plurality of points, and a plurality of magnetic elements linked by said selecting lines with each of said elements linked at a different one of said points of crossing to the associated ones of said first and second lines, each of said elements being threaded by pairs of all of the coil sides in the associated selecting lines, each of said elements being made of a material having substantial flux at remanence, the number of said first lines and the number of said elements linked by each of said first lines each being at least equal to said radix raised to an exponent, the number of said coil sides forming each of said selecting lines being at least equal to said exponent, the number of said coils being at least equal to the product of said radix and said exponent.

19. A magnetic switch arranged in accordance with a certain number radix, said switch comprising a plurality of first coils and a plurality of second coils each separately arranged in a plurality of groups, each of said coils having a plurality of straight coil sides, a plurality of first and second coil selecting lines each respectively formed of a different combination of an aligned plurality of said first and second coil sides, each of said selecting lines including a coil side from each of the associated ones of said groups, said first coil selecting lines being transverse to and crossing said second coil selecting lines at a plurality of points, and a plurality of magnetic elements linked by said selecting lines with each of said elements being linked at a different one of said points of crossing to the associated ones of said first and second coil selecting lines, each of said elements being threaded by one side of all of the coil sides in the associated selecting lines, each of said elements being made of a material having substantial flux at remanence, the number of each of said first and second coil selecting lines being at least equal to said radix raised to an exponent, the number of said coil sides forming each of said selecting lines being at least equal to said exponent, the number of each of said first and second coils being at least equal to the product of said radix and said exponent.

20. In apparatus of the class described, the combination comprising a first plurality of input coils, one of said coils being formed of a plurality of conductive turns, a first plurality of magnetic cores mounted at spaced points along said one coil, each of said conductive turns linking each core of said plurality of cores, a second plurality of cores, the remaining ones of said plurality of coils being coupled to said second plurality of cores, a second plurality of input coils transverse to said first plurality of input coils, each coil of said second plurality of coils linking one or more cores of said second plurality of cores and also linking respectively the cores of said first plurality of cores.

21. In apparatus of the class described, the combination comprising a first plurality of coils each formed of a plurality of conductive turns, a like plurality of groups of magnetic cores, said groups corresponding respectively to said coils and each group having a plurality of cores, the cores of any group being mounted at spaced points along the coil corresponding to that group with each of said conductive turns of that coil linking each core of its corresponding group, and a second plurality of coils transverse to said first plurality of coils and linking the said cores.

22. In apparatus of the class described, the combination comprising a first plurality of row coils each formed of a plurality of conductive turns, a like plurality of groups of magnetic cores, said groups corresponding respectively to said coils and each group having a plurality of cores, the cores of any group being mounted at spaced points along that row coil corresponding to that group with each of said conductive turns of that coil linking each core of its corresponding group, and a second plurality of column coils, each of said column coils linking cores in different ones of said groups, whereby each of said cores are linked to a multiple turn row coil and to a column coil at intersections thereof in a row and column array of coils.

References Cited in the file of this patent

UNITED STATES PATENTS

| | | |
|---|---|---|
| 2,501,558 | Williams | Mar. 21, 1950 |
| 2,534,354 | Keller | Dec. 19, 1950 |
| 2,681,181 | Spencer | June 15, 1954 |
| 2,691,155 | Rosenberg | Oct. 5, 1954 |
| 2,712,126 | Rosenberg et al. | June 28, 1955 |
| 2,750,580 | Rabenda | June 12, 1956 |

FOREIGN PATENTS

| | | |
|---|---|---|
| 229,388 | Great Britain | Feb. 23, 1925 |

OTHER REFERENCES

Publication, Progress Report (2) on EDVAC, Moore School, University of Penn. (page PY–O–164), June 30, 1946.